United States Patent
Shin et al.

(10) Patent No.: US 9,661,163 B1
(45) Date of Patent: May 23, 2017

(54) MACHINE LEARNING BASED SYSTEM AND METHOD FOR IMPROVING FALSE ALERT TRIGGERING IN WEB BASED DEVICE MANAGEMENT APPLICATIONS

(71) Applicant: Xerox Corporation, Norwalk, CT (US)

(72) Inventors: Helen Haekyung Shin, Fairport, NY (US); William Peter Oatman, Honeoye Falls, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/042,626

(22) Filed: Feb. 12, 2016

(51) Int. Cl.
*G06F 3/12* (2006.01)
*H04N 1/00* (2006.01)
*G06N 7/00* (2006.01)
*G06N 99/00* (2010.01)
*G06K 15/00* (2006.01)

(52) U.S. Cl.
CPC ......... *H04N 1/00344* (2013.01); *G06N 7/005* (2013.01); *G06N 99/005* (2013.01); *H04N 1/00015* (2013.01); *H04N 1/00037* (2013.01); *H04N 1/00061* (2013.01); *H04N 1/00079* (2013.01); *H04N 2201/0094* (2013.01)

(58) Field of Classification Search
CPC ........... H04N 1/00344; H04N 1/00015; H04N 1/00037; H04N 1/00061; H04N 1/00079; H04N 2201/0094; G04N 7/005; G06N 99/005; G06F 11/008
USPC ............. 358/1.1, 1.9, 1.13, 1.14, 1.15, 1.18; 704/256, E15.001
See application file for complete search history.

(56) References Cited

U.S. PATENT DOCUMENTS

| 7,509,244 B1 * | 3/2009 | Shakeri ................. G06F 9/5044 703/13 |
| 8,264,702 B2 | 9/2012 | St. Jacques, Jr. et al. |
| 8,965,949 B2 | 2/2015 | Thieret |
| 9,046,854 B2 | 6/2015 | Yang et al. |
| 2002/0184360 A1 | 12/2002 | Weber et al. |
| 2003/0218767 A1 | 11/2003 | Schroath et al. |
| 2007/0002365 A1 | 1/2007 | Pesar et al. |
| 2008/0300879 A1 | 12/2008 | Bouchard et al. |
| 2010/0238485 A1 | 9/2010 | Miyamoto |
| 2012/0076516 A1 | 3/2012 | Rapkin et al. |

(Continued)

OTHER PUBLICATIONS

Li, J. et al., "Image Classification by a Two-Dimensional Hidden Markov Model," IEEE Transactions on Signal Processing (2000) 48(2):517-533.

(Continued)

*Primary Examiner* — Gabriel Garcia
(74) *Attorney, Agent, or Firm* — Kevin Soules; Kermit D. Lopez; Luis M. Ortiz

(57) ABSTRACT

Methods, systems, and processor-readable media for remotely providing a device status alert. In an example embodiment, data indicative of the status of one or more devices can be subject to an HMM (Hidden Markov Model) and a dynamic programming algorithm to determine the latent state of the device (or devices). A status alert model can be trained based on such data and can be expanded with respect to a wide range of devices including utilizing semi-supervised learning. The alert status model can then be integrated into a device management application that provides a status alert regarding one or more of such devices based on the status alert model.

20 Claims, 9 Drawing Sheets

(56) References Cited

U.S. PATENT DOCUMENTS

2012/0076518 A1    3/2012  Rapkin et al.
2012/0290511 A1*  11/2012  Frank .................. G06N 99/005
                                                                     706/12
2014/0222997 A1    8/2014  Mermoud et al.
2015/0106405 A1    4/2015  Bapat et al.

OTHER PUBLICATIONS

Backes, M. et al., "Acoustic Side-Channel Attacks on Printers," Proceeding USENIX Security '10 Proceedings of the 19th USENIX conference on Security (2010) Berkeley, CA, 16 pages.
Semi-supervised learning, Semi-supervised learning—Wikipedia, the free encyclopedia, https://en.wikipedia.org/wiki/Semi-supervised_learning, printed Dec. 21, 2015, 7 pages.

* cited by examiner

| | | | | |
|---|---|---|---|---|
| ⊗ | Intervention Required | 13.121.238.55 | Network Printer | Xerox WorkCentre 7665 v1 Multifunction System | VDR538389 |
| ⊗ | No answer from device | 13.121.238.58 | Network Printer | Xerox WorkCentre 5632 v1 Multifunction System | WRT614417 |
| ⊗ | Out of Paper | 13.121.238.194 | Network Printer | Xerox Phaser 6200 DP | XXXXXXXX |
| ⊗ | Intervention Required | 13.121.238.57 | Network Printer | Xerox ColorQube 9201 | 804000268 |
| ⊗ | Paper Jammed | 13.121.237.197 | Network Printer | HP LaserJet M4345 MFP | CNCC6C240T |
| ⚠ | Intervention Required | 13.121.238.64 | Network Printer | Xerox WorkCentre Pro 245 | UTT852090 |
| ⚠ | Paper Jammed | | | | MFG:Xerox;CMD:PC |
| ⚠ | Toner/Ink Low | | An indicator of the print status severity (error, warning, okay state) | | 3310920010 |
| ⚠ | Intervention Required | 13.121.238.11 | Network Printer | Xerox WorkCentre 7245 | 3521800282 |
| ⚠ | Low Paper | 13.121.238.51 | Network Printer | Xerox WorkCentre 7755 v1 Multifunction System | VDR535610 |
| ⚠ | Toner/Ink Low | 13.121.238.54 | Network Printer | Xerox Phaser 6280N | 000000000 |
| ⚠ | Consumable Missing | 13.121.238.118 | Network Printer | Xerox Phaser 6180MFP-N | GNX113971 |
| ⚠ | Intervention Required | 13.121.238.53 | Network Printer | Xerox WorkCentre 4250 | B1DQB00010 |
| ◯ | Up and Running | 13.121.238.60 | Network Printer | Lexmark Optra S 2455 | 11HAX37 |
| ◯ | Up and Running | 13.121.238.50 | Network Printer | Xerox Phaser 7500DX | XRX456789 |
| ◯ | Up and Running | 13.121.238.13 | Network Printer | HP LaserJet 4000 Series | USNC046069 |
| ◯ | Up and Running | 13.121.238.46 | Network Printer | Xerox WorkCentre 5225 | KBM524010 |

FIG. 1
PRIOR ART

▼ Printer Status

General Status
Status Age 6/8/2009 2:45:17 PM
Status Date 6/8/2009 2:45:17 PM
Last Status Attempt
Machine Up Time 45 Day(s) 6 Hour(s) 51 Minute(s) 59 seconds ⚠ Functioning but has one or more warnings
Warnings: Consumable Missing, Input Tray Empty, Output Tray Missing

Supplies Status
None

Alert Details

| | Skill Level | Description | Time (Age) |
|---|---|---|---|
| ⚠ | Trained | 093-423:Yellow print cartridge near end of life. Replace Yellow print cartridge soon. Printer is able to print. | 4/28/2009 8:33:11 PM (40 Day(s) 18 Hour(s) 12 Minute(s) 5 seconds) |
| ⚠ | Trained | 093-426:Black print cartridge near end of life. Replace Black print cartridge soon. Printer is able to print. | 4/28/2009 8:33:11 PM (40 Day(s) 18 Hour(s) 12 Minute(s) 5 seconds) |
| ⊙ | Untrained | Power Saver. No intervention required. Printer will wake up when user sends a print job or by pressing the Power Saver button. Printer status may not be valid when engine is turned off. | 4/28/2009 8:33:11 PM (40 Day(s) 18 Hour(s) 12 Minute(s) 5 seconds) |

Traps Supported Yes
Traps Enabled [1] No

| Icon | Status Description | Extended Warnings | Date |
|---|---|---|---|
| ⚠ | Functioning but has one or more warnings Warnings: Low Paper, Out of Paper, Toner/Ink Low | None | 3/25/2008 7:24:52 AM |
| ⊙ | Up and Running | None | 3/25/2008 6:42:13 AM |
| ⚠ | Functioning but has one or more warnings Warnings: Low Paper, Out of Paper, Toner/Ink Low | None | 3/25/2008 5:24:33 AM |
| ⊙ | Up and Running | None | 3/25/2008 4:24:10 AM |
| ⚠ | Functioning but has one or more warnings Warnings: Low Paper, Out of Paper, Toner/Ink Low | None | 3/25/2008 3:10:18 AM |
| ⚠ | Functioning but has one or more warnings Warnings: Low Paper, Out of Paper, Toner/Ink Low | None | 3/25/2008 3:04:12 AM |

▽ History — 56

FIG. 5
PRIOR ART

MACHINE LEARNING BASED SYSTEM AND METHOD FOR IMPROVING FALSE ALERT TRIGGERING IN WEB BASED DEVICE MANAGEMENT APPLICATIONS

TECHNICAL FIELD

Embodiments are generally related to rendering devices such as printers, scanners, photocopy machines, and multi-function devices. Embodiments additionally relate to web-based device management applications. Embodiments also relate to the field of machine learning and artificial intelligence.

BACKGROUND

Device Management Applications (DMAs) such as Xerox Device Manager (XDM) or Xerox Centre Ware Web (XCWW) are installed to manage devices such as printers or multi-function devices in a Web-based environment. Such applications allow users to discover devices and collect data from the device on a scheduled basis and display information via a network discovery protocol. The data collected from the device includes device configuration information, settings, meters, supply levels, and alerts. Among the data collected, the printer status is retrieved at scheduled configurable intervals. The status updates combine device alerts retrieved from the printer or upon configured traps from the printers.

Table 1 below illustrates an example of standard alerts that may be defined by a printer and contained in a Printer MIB (Management Information Base). In this example, each print status type is classified as a different print alert state. The device solely defines the state classification.

TABLE 1

| NoResponse 0x4000000 | InputTrayMissing 0x8000 | QueueManualFeed 0x200000000 |
|---|---|---|
| TechDispatchReq 0x80000000000 | OverduePreventMaintenance 0x200 | QueuePagePunt 0x8000000000 |
| PaperJam 0x04 | TonerLow 0x20 | |
| NoToner 0x10 | LowPaper 0x80 | Printer State List |
| MarkerSupplyMissing 0x2000 | OutputNearFull 0x1000 | Error 0x100000 |
| NoPaper 0x40 | OfflineOnly 0x20000000 | Printing 0x1000000 |
| OutputFull 0x800 | UnspecWarn 0x8000000 | Unspecified 0x10000 |
| OutputTrayMissing 0x4000 | QueueAccessDenied 0x40000000000 | Testing 0x80000 |
| DoorOpen 0x08 | QueueNoMemory 0x20000000000 | |
| ServiceRequested 0x01 | QueuePaused 0x80000000 | Warning 0x40000 |
| OfflineServiceRequested 0x40000000 | QueuePaperProblem 0x4000000000 | Warmingup 0x2000000 |
| UnspecError 0x10000000 | QueueWaiting 0x2000000000 | |
| Offline 0x02 | QueueIntervention 0x10000000000 | Okay 0x100000 |
| InputTrayEmpty 0x400 | QueuePaperProblem 0x400000000 | UpAndRunning 0x20000 |

FIG. 1 illustrates a screen shot 10 of an example list view of a device status of a prior art device management application. FIG. 2 illustrates a screen shot 20 of an example detailed print status in a prior art device management application. As shown in FIGS. 1 and 2, the status is available for all printers discovered with an indicator of the severity of device status or within the printer details screen in, for example, an XDM user interface (UI). Such a web based DMA may create device alert incidents based on the device status or alerts. When the application, such as an XDM, triggers the alert and updates the alert, the data is exported to another application such as, for example, a Xerox Services Manager (XSM) for the further processing to generate, for example, Device Remote Alerts (DRAs) based on the input from device status.

DMAs such as XDM or XSM offer no control over printer status alerts such as those listed in Table 1. DMAs only use this data to determine if the device is in one of these error states. No logic with DMA currently exists that can help determine the state of the device. When the device has some problems in the logic or in the firmware to determine the status of the device, false alerts will be collected in DMAs and the user might get the false alarm. In some cases, the same print status results in a different severity level of alerts.

FIG. 3 illustrates a flow chart of operations of a method 31 for implementing a Get Print Status String 31 and a method 33 for generating Get Print State Level in a prior art device management application. As shown at block 32, an operation is implemented wherein print status bits are retrieved from the device on scheduled intervals. As indicated at block 34, a print status ID type mask (e.g., status bit) is pre-generated. That is, a list of print status ID masks is pre-generated. This step involves identifying all matched print status bits. Among these, the first matched print status is identified as shown in block 36.

An operation is then implemented as indicated at block 36 to find the prioritized matched print status. The first matched status is then displayed in a UI (User Interface) as shown at block 38. Regarding method 33 (i.e., Get Print State Level), an operation can be implemented as shown at block 42 in which print status bits are retrieved from the device, followed by a determination of whether or not to generate an error state mask, as shown at block 44. The error state masks and warning state masks are pre-generated meaning that XDM has a predetermined status for each state. The steps will find the matched status against this mask. If the match is found in error mask, it is assigned as an error. The same is true with respect to a warning state.

Assuming the answer with respect to the operation depicted at block 44 is "yes," an error is then displayed as shown at block 46. Assuming the answer with respect to the operation depicted at block 44 is "no," a decision is then made as shown at block 48 to determine whether or not to generate a warning state mask. If the answer is "no," then a display message indicating "okay" is generated as illustrated at block 52. If the answer is yes, then a warning can be displayed, as indicated at block 50. Note that in the context of a logic diagram, these steps can be stated as: IF found the match in error mask, it is an error state, ELSE IF found match in warning state, it is a warning state, ELSE it is in okay state.

The operations shown in FIG. 3 demonstrate how a DMA such as, for example, XDM can obtain the print status and determine alert levels and display the resulting information for users. As described in Get Print Status String routine of method 31, the print status is prioritized and top print status string matched is displayed. The priority list is defined in global settings (GS) in XDM based on business strategy decision. The priority print status list in GS is shown in Table 1.

When several print status bits are turned on, the top most matched print status to this priority list will be displayed as a string. For example, when the printer status bit of "ServiceRequired", "LowToner", "LowPaper", and "Warning" are received from the device, the XDM UI displays the message "ServiceRequired" since it has the precedence over other status bits. In this case, the alert level is recorded as a warning state according to the printer state received from the device. As depicted in FIG. 1, some devices show this status alert as an error state while some devices indicate this as a warning state. FIG. 4 shows the same status for "No Toner/Ink" in different printers that show different severity levels. FIG. 4 illustrates a screen shot 40 of an example list view of a device with no toner/ink status in a prior art device management application.

FIG. 5 illustrates a screen shot 56 displaying information indicative of print status information cycles during a status polling of scheduled intervals generated by a prior art device management application. Some devices remove existing error status from its list of errors when other errors occur in the devices. This is a well-known problem in devices which cycles print status bits or print status strings. Some examples of devices that show this type of issue are shown in FIG. 5. These types of behaviors can cause unwanted alerts or notifications.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved device management applications.

It is another aspect of the disclosed embodiments to provide for methods and systems for reducing false alert triggering in a web-based device management application.

It is yet another aspect of the disclosed embodiments to improve the accuracy of an alert triggering rate.

The aforementioned aspects and other objectives and advantages can now be achieved as described herein. Methods and systems for remotely providing a device status alert are disclosed. In an example embodiment, data indicative of the status of one or more devices can be subject to an HMM (Hidden Markov Model) and a dynamic programming algorithm to determine the latent state of the device (or devices). A status alert model can be trained based on such data and can be expanded with respect to a wide range of devices including utilizing, for example, semi-supervised learning. The alert status model can then be integrated into a device management application that provides a status alert regarding one or more of such devices based on the status alert model.

Such an approach can be implemented in the context of a DMA (device management application) to minimize false alerts and unnecessary service calls. The prediction of a latent state of a machine or device for an observed print status, for example, can be accomplished utilizing sequential temporal print status data collected from the device in web-based environment. The following operations can be implemented. First, data is collected. That is, print status and alerts can be collected from the device on scheduled configurable intervals and stored in a printer database or a central knowledge base. Second, the latent print state can be estimated based on the observed sequential temporal print status data utilizing Hidden Markov Models (HMMs) and a dynamic programming algorithm, such as, but not limited to a Viterbi algorithm. The status alert model can be trained utilizing the ground truth print state data and the goodness of the model can be tested utilizing unseen data. Third, a first status alert model can be obtained from any specific device. The model can be expanded to a wide range of devices (e.g., same printer model and/or different machines with different printer models) utilizing a semi-supervised learning technique. Fourth, the model can be integrated into a DMA alert system. The status alert model can also be integrated into an existing print status alert system in the context of a DMA.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a screen shot of an example list view of a device status of a prior art device management application;

FIG. 2 illustrates a screen shot of an example detailed print status in a prior art device management application;

FIG. 5 illustrates a screen shot displaying information indicative of print status information cycles during a status polling of scheduled intervals generated by a prior art device management application;

DETAILED DESCRIPTION

Figure 3:
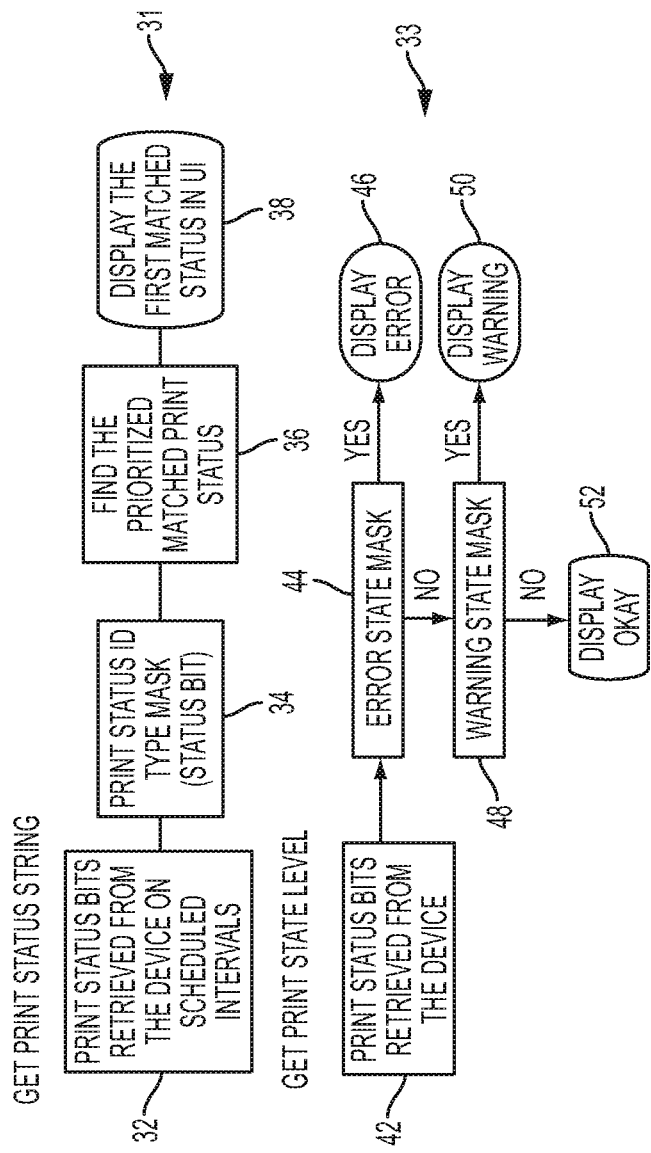
FIG. 3 illustrates a flow chart of operations of a method for implementing a Get Print Status String and a method for generating Get Print State Level in a prior art device management application.
Figure 4:
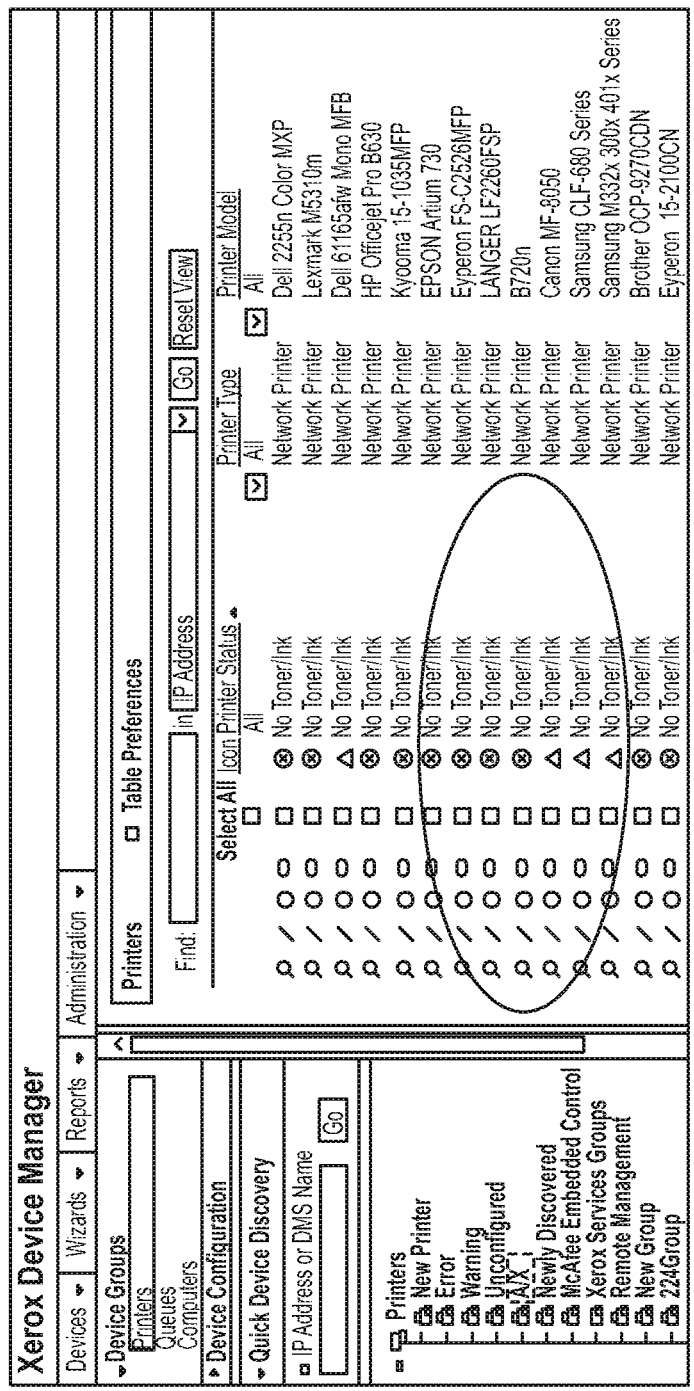
FIG. 4 illustrates a screen shot of an example list view of a device with no toner/ink status in a prior art device management application.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

No intelligence with DMA currently exists that can help determine the state of the device. When the device has some problems in the firmware or sensor to determine the status of the device, false alerts will be collected in DMAs. Some devices will remove existing error status from its list of errors when other errors occur in the devices. This is a well-known problem in devices which cycles print status bits or print status strings. Device remote alert (DRA) incident is opened for the first alert threshold when the error status is detected. However, the existing incident may be updated as the okay state since the print status is no longer existed. Therefore, the incident is closed in DRA. This results in the false negative alert in DRA.

Note that in some cases, the devices may send the same print status with a different severity level of alerts. For example, the print status of "No Toner/Ink" is one of error state defined by the device. Some devices send this status as an error state while others send this as a warning. If the device alert in a DMA is triggered by the print status obtained from the device, this may result in false positive alerts with the printer with warning state. Example embodiments are disclosed in which a remote status alert system and method can be implemented in the context of device management applications (DMAs) that minimize false alerts triggering and resulting unnecessary service calls by utilizing the temporal sequential data collected from the device.

Figure 6:
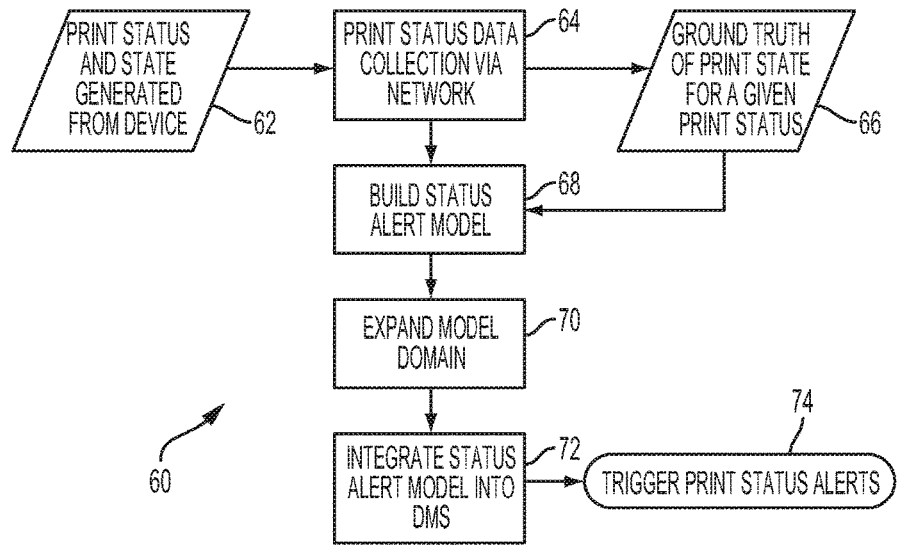
FIG. 6 illustrates a flow chart of operations depicting logical operational steps of a method for providing remote print status alerts, in accordance with an example embodiment.

FIG. 6 illustrates a flow chart of operations depicting logical operational steps of a method 60 for providing remote print status alerts, in accordance with an example embodiment. FIG. 6 shows a flow diagram of steps or operations that can be implemented for a remote print status alert system. Thus, as shown at block 62, a step or operation can be implemented in which the print status and state of a device (printer) are generated from the device. Note that this operation can be implemented in the context of an existing operation in the printer. The printer, for example, may generate a print status and alerts in a format defined by the specification. The DMA can utilize this information.

Thereafter, as indicated at block 64, a step or operation can be implemented involving print status data collection via a network printing protocol (e.g., Internet Printing Protocol (IPP), Simple Network Management Protocol (SNMP), Transmission Control Protocol/Internet Protocol (TCP/IP), etc.). Two operational paths may be implemented.

That is, some portion of data can be implemented for ground-truth (e.g., see block 66). The rest of the data that is not labeled can also be utilized for building the model. Thus, in response to the print status data collection operation shown in block 64, a step or operation can be implemented using the small portion of the data for generating the ground truth of a print state for a given print status, as depicted at block 66. Thereafter, an operation can be implemented as illustrated at block 68 in which a build status alert model as discussed in further detail below is implemented. The rest of the data collected may be processed directly after processing of the instructions shown at block 64.

Following processing of the build status alert model, as depicted at block 68, an expand model domain step or operation can be implemented as indicated at block 70. Such an expand model domain is discussed in greater detail below. Thereafter, as illustrated at block 72, the status alert model can be integrated into a DMS. Finally, an operation can be implemented as described at block 74 to trigger print status alerts.

Print Status Data Collection

A DMA provides the user with the ability to find devices and collect data from the device on scheduled intervals via its network protocols. The data collected from the device can include, for example, device configuration information, settings, meters, supply levels, and alerts. The printer status can be retrieved and updated at scheduled configurable intervals and stored in a database in the device, application server, and/or main server. The severity of the print state related to the given print status can also be retrieved and stored in the database at scheduled intervals.

The ground truth of the print state for a given print status during a certain period of time may be obtained by a CSE (Customer Service Engineer) or users by any feedback mechanism. When CSEs or users respond to failures in the device or service calls, they would record the incident report if the failure is related to the corresponding print status reported. The set of labeled data collected from this feedback mechanism is stored in the database and utilized for the training of the model with the rest of the data, which is not labeled.

Build Printer Status Alert Model

Figure 7:
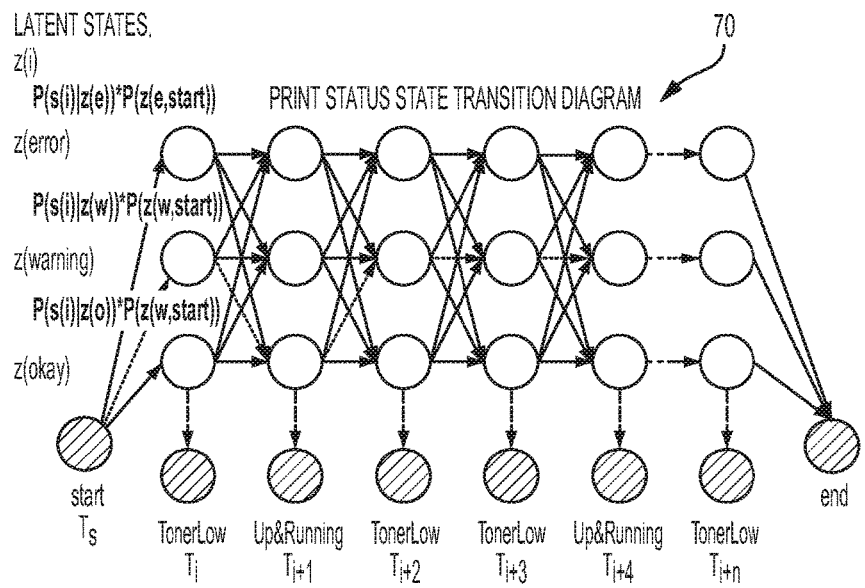
FIG. 7 illustrates a print status state transition diagram, in accordance with an example embodiment.

FIG. 7 illustrates a print status state transition diagram of a sequential print status alert model 70, in accordance with an example embodiment. The latent print state can be estimated based on the observed print status data at scheduled intervals. This sequential data can be represented utilizing a Hidden Markov Model (HMM) of latent print states with each observed print status conditioned on the latent print states. FIG. 7 thus shows the graphical representation of the sequential print status alert model discussed herein.

As shown in FIG. 7, the probability of each state at time i (Ti) corresponds to a mixture of three distributions, with state densities given by $P(s|z_k)$, where s represents the observed print status (e.g. "TonerLow") and z represents the latent state. There are three latent states (k=3) for each print status in this model: error state, warning state, and okay state. A goal is determined the best sequence of the print state that corresponds to the sequence of print status. Estimates of the correct print state sequence can be modeled according to equation (1) below:

$$\hat{Z}_{k=1}^{n} = \text{argmax}_{z_1^n} P(z_1^n | s_1^n) \quad (1)$$

The hat notation (^) means the estimate of the correct print state sequence and the function $\text{argmax}_x f(x)$ means the x such that $f(x)$ is maximized. Therefore, equation (1) means that out of the print state sequence of length n, the particular print state sequence $z_1^n$ that maximizes $P(z_1^n|s_1^n)$ is desired. This can be further simplified using Bayes' rule as shown in equation (2) below:

$$\hat{Z}_{k=1}^{n} = \text{argmax}_{z_1^n} P(s_1^n | z_1^n) P(z_1^n) \quad (2)$$

The first term $P(s_1^n|z_1^n)$ is the likelihood of the print status and the second term $P(z_1^n)$ is the prior probability of the print state sequence. In order to simplify this formulation and to be further solvable, it can be assumed that the print status is independent of other printer status. For example, the print status of "TonerLow" is independent of the print status of "Low Paper" or "Up & Running". If it is assumed that the probability of a state sequence is dependent only on the previous state, the equation (2) can be simplified as shown in equation (3) below (i.e., a two-sequence model):

$$\hat{Z}_{k=1}^{n} = \text{argmax}_{z_1^n} P(s_1^n | z_1^n) P(z_1^n) \approx \text{argmax}_{z_1^n} \prod_{i=1}^{n} P(s_i | z_i) P(z_i | z_{i-1}) \quad (3)$$

The three sequence model considers the probability of a state sequence is dependent on the two-previous states as shown in equation (4) below:

$$\hat{Z}_{k=1}^{n} \approx \text{argmax}_{z_1^n} \prod_{i=1}^{n} P(s_i | z_i) P(z_i | z_{i-1}, z_{i-2}) \quad (4)$$

At time $T_{i+1}$, the choice of mixture latent states for the observed print status (e.g., "Up & Running") is not selected independently, but depends on the choice of component for the previous observation. The maximum likelihood of print state sequence densities $P(z_i|z_{i-1})$ and $P(s_i|z_i)$ can be computed by taking the print states from the labeled print status data and counting them as follows:

$$P(z_i | z_{i-1}) = \frac{c(z_i, z_{i-1})}{c(z_{i-1})} \text{ and } P(s_i | z_i) = c(z_i, s_i)/c(z_i).$$

For example, when $s_i$ is "Up & Running", $P(s_i|z_i)$ can be calculated from the data collected for each latent state by taking $c(\text{error},s_i)|c(\text{error})$, $c(\text{warning},s_i)|c(\text{warning})$, and $c(\text{okay},s_i)|c(\text{okay})$, respectively, $P(s_i|z_{i-1})$ can be calculated for the combination of different transition states. For example, P(error|error) where $z_{i-1}$ is an error state and $z_i$ is an error state, c(error,error) can be calculated by counting the cases of two consecutive error cases observed, and c(error) can be obtained by counting the total error state in the data set.

Table 2 below shows a transition matrix of three latent print states, in accordance with an example embodiment.

TABLE 2

Transition Matrix of Latent Print States, $P(z_i|z_{i-1})$

| | $z_i$ | | |
| --- | --- | --- | --- |
| $z_{i-1}$ | error | warning | okay |
| error | P(error\|error) | P(warning\|error) | P(okay\|error) |
| warning | P(error\|warning) | P(warning\|warning) | P(okay\|warning) |
| okay | P(error\|okay) | P(warning\|okay) | P(okay\|okay) |

The remaining print state transition sequence probability can be computed by counting the example cases shown in Table 2 from the labeled data. The transition states can be continually unfolded and the optimum transition path that maximizes the probability utilizing a dynamic programming algorithm, such as, for example, a Viterbi algorithm (e.g., see the Viterbi module 120 shown in FIG. 10) can be determined. In FIG. 7, for example, thin arrows represent all possible transition state sequences, while thicker arrows represent the maximum likelihood sequence calculated using a Viterbi algorithm. From the trained model, the maximum likelihood of sequential print state of the corresponding sequential print status can be identified. The trained model can then be tested and evaluated utilizing unseen data.

Domain Adaptation of Status Alert Model

The obtained model can be built on the limited set of data collected from one machine or several machines of the same printer model due to the effort and time needed for obtaining the ground truth data. Once the accurate model is obtained utilizing a supervised learning technique, the model can be expanded utilizing a semi-supervised learning technique, such as, for example, self-training or co-training with a wide range of domain data. The data can be collected from several machines of the same printer model or several machines with different models.

Note that as utilized herein, the term semi-supervised learning refers generally to a particular class of machine learning involving supervised learning techniques and tasks that also make use of unlabeled data for training, typically a small amount of labeled data with a large amount of unlabeled data. Semi-supervised learning falls between unsupervised learning (without any labeled training data) and supervised learning (with completely labeled training data).

Figure 8:
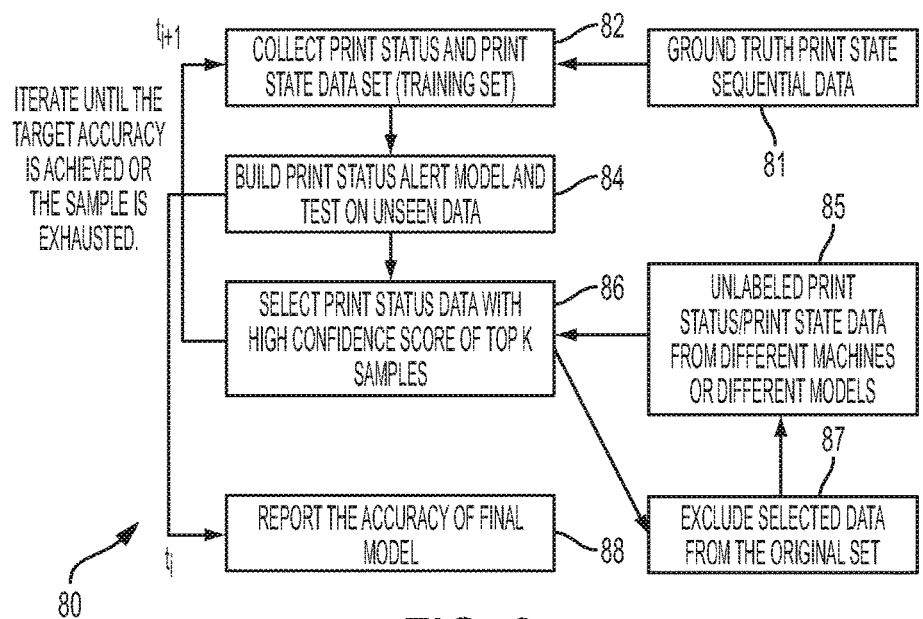
FIG. 8 illustrates a flow chart of operations depicting logical operational steps of a method for domain adaptation of a print state alert model utilizing a self-training technique, in accordance with an example embodiment.

FIG. 8 illustrates a flow chart of operations depicting logical operational steps of a method 80 for domain adaptation of a print state alert model utilizing a self-training technique, in accordance with an example embodiment. A print model building flow can follow the previously described methods. As shown at block 82, an operation can be implemented to collect the print status and print state data set (e.g., a training set). As shown at block 81, an operation implements ground truth print state sequential data. Additionally, as indicated at block 84, an operation can be implemented to build the print status alert model and test it on the unseen data. As described at block 86, an operation can be implemented to select print status data with a high confidence score of top K samples. As depicted at block 88, an operation can be implemented to report the accuracy of the final model. Other operations involve unlabeled print status/print state data derived from different machines or different models, as shown at block 85, and excluding selected data from the original set, as depicted at block 87. The example operations shown in blocks 84 to 87 can be repeated until the target accuracy is achieved or data is exhausted.

Integration of Status Alert Model into DMA

Figure 9:
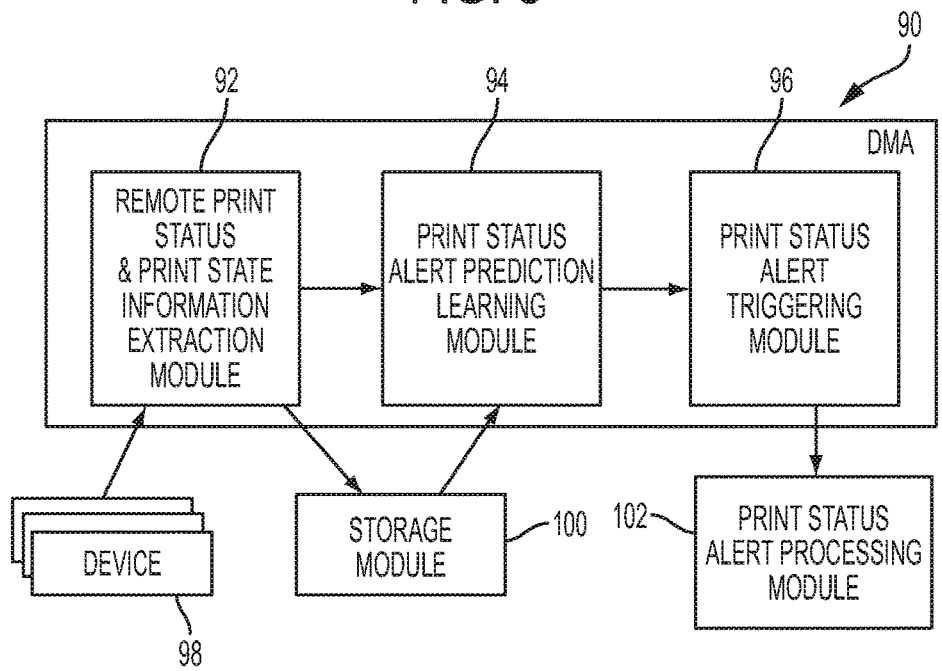
FIG. 9 illustrates a workflow diagram depicting the workflow of a remote print status alert system for a device management application, in accordance with an example embodiment.

FIG. 9 illustrates a workflow diagram depicting a workflow of a remote print status alert system 90 for a device management application, in accordance with an example embodiment. The status alert module 94 based on HMMs and a Viterbi algorithm as discussed previously can be integrated into a print status/state extraction (SSE) module and (e.g., the SSE module 92 shown in FIG. 10) an alert triggering module (e.g., the alert triggering module 96 shown in FIG. 10) in a DMA such as, for example, but not limited to an XSM or an XDM. FIG. 9 depicts the workflow of an example print status alert system that can be integrated into a DMA. The sequential print status and print state data collected at scheduled intervals can be stored in a database in an application server or in a database in a main server. The system 90 includes a module 92 that provides a remote print status and print state information extraction. System 90 can also include a print status alert prediction learning module 94 and a print status alert triggering module 96. The block 98 shown in FIG. 9 represents a printer (or multiple printers) or other types of rendering devices. System 90 also includes a storage module 100 which can facilitate storage of data in databases such as, for example, databases 117, 119 shown in FIG. 10. System 90 further includes a print status alert processing module 102.

Figure 10:
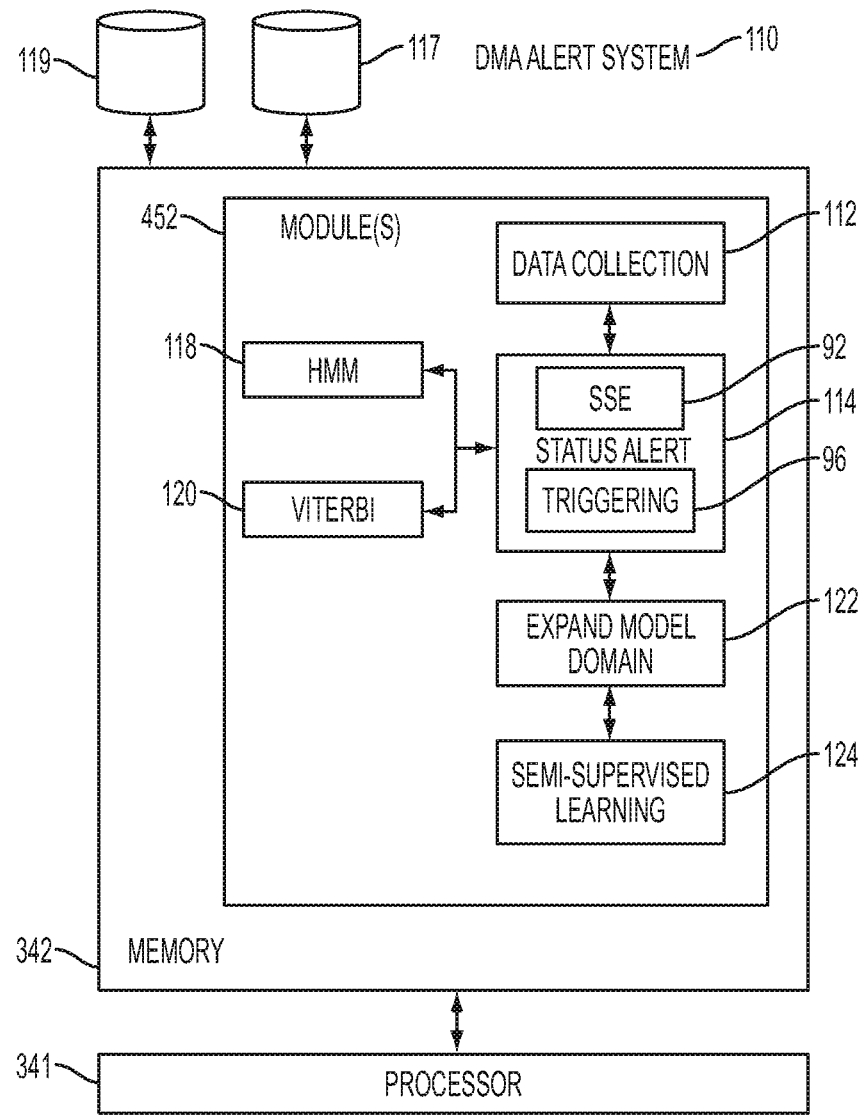
FIG. 10 illustrates a block diagram of a learning based system for improving false alert triggering in a device management application, in accordance with an example embodiment.

FIG. 10 illustrates a block diagram of a learning based remote print status alert system 110 for reducing false alert triggering in a device management application, in accordance with an example embodiment. The print status alert system shown in FIG. 10 includes a module(s) 452 composed of a group of modules (or sub-modules) including a data collection module 112, a status alert module 114, and an expand model domain module 122. The status alert module 114 interacts with an HMM (Hidden Markov Model) module 118 and a Viterbi module 120 (e.g., which provides for computer implemented instructions based on a Viterbi algorithm). The module 452 is maintained with a memory 342 and is processed via a processor 341 (e.g., a CPU or Central Processing Unit, or other electronic processing component).

In the example embodiment shown in FIG. 10, the remote print status alert system 110 can be implemented in the context of a Web based DMA so as to minimize false alerts and unnecessary service calls. The prediction of the latent state of the machine for an observed print status can be accomplished utilizing the sequential temporal print status data collected from the device in, for example, a Web based environment. Note that the term "web" or "Web" as utilized herein refers to the World Wide Web (WWW), which is an open source information space where documents and other web resources are identified by URLS, interlinked by hypertext links, and can be accessed via the Internet.

The system 110 includes the data collection module 112, wherein print status and alerts are collected from the device on scheduled configurable intervals and stored in a printer database 119 and/or a central knowledge database 117. The build status alert module 114 implements instructions of a build status alert model (an example of which was described previously herein). That is, the latent print state can be estimated based on observed sequential temporal print status data utilizing a Hidden Markov Model (HMM) provided by the HMM module 118 and a Viterbi algorithm provided by the Viterbi module 120. The status alert model provided by the build status alert module 114 can be trained utilizing a labeled print state and tested using the unseen data. The expand model domain module 122 allows the status alert provided by the build status alert module 114 to be obtained from any specific device. The status alert module 114 can include sub-modules such as, for example, a status/state extraction (SSE) module 92 and an alert triggering module 96.

The model can be expanded to a wide range of devices (e.g., same printer model and/or different machines with different printer models) utilizing a semi-supervised learning module 124. The various modules including models and algorithms thereof as described above can be integrated into the DMA alert system 110 which may be, for example, an existing print status alert system in a DMA.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the users computer, partly on the user's computer, as a stand-alone software package, partly on the users computer and partly on a remote computer, or entirely on the remote computer. In the latter scenario, the remote computer may be connected to a user's computer through a local area network (LAN) or a wide area network (WAN), a wireless LAN, wireless data network (e.g., Wi-Fi, Wimax, IEEE 802.xx wireless standards), and cellular network or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 11:
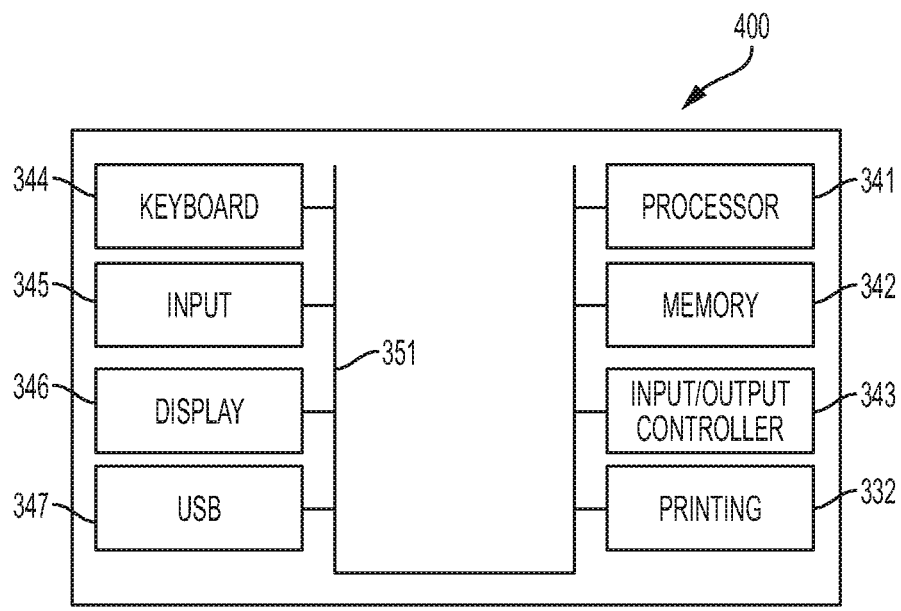
FIG. 11 illustrates a schematic view of a computer system, in accordance with an example embodiment.
Figure 12:
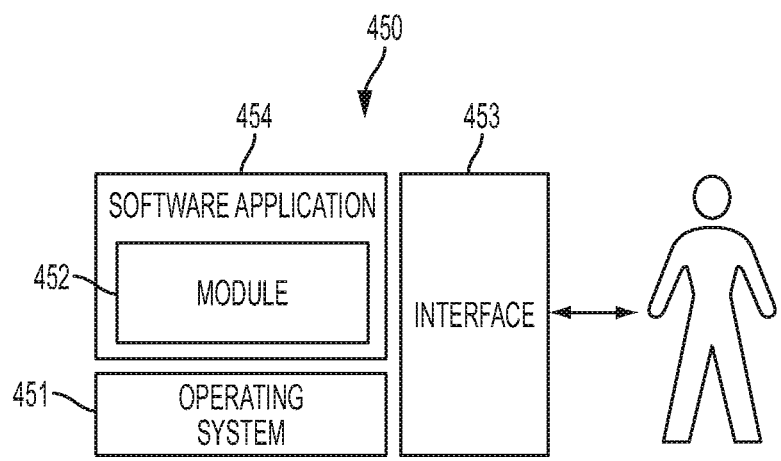
FIG. 12 illustrates a schematic view of a software system including a module, an operating system, and a user interface, in accordance with an example embodiment.

FIGS. 11-12 are shown only as exemplary diagrams of data-processing environments in which embodiments may be implemented. It should be appreciated that FIGS. 11-12 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 11, some embodiments may be implemented in the context of a data-processing system 400 which may be, for example, a client-computing device (e.g., a client PC, laptop, tablet computing device, etc.) that communicates with peripheral devices (not shown) via a client-server network (e.g., wireless and/or wired). In other embodiments, data-processing system 400 may functions as a server in the context of such a client-server network.

The example data-processing system 400 shown in FIG. 11 can include a system bus 351 and one or more processors such as processor 341 (e.g., a CPU or Central Processing Unit), a memory 342 (e.g., random access memory and/or other types of memory components), a controller 343 (e.g., an input/output controller), a peripheral USB (Universal Serial Bus) connection 347, a keyboard 344 (e.g., a physical keyboard or a touchscreen graphically displayed keyboard), an input component 345 (e.g., a pointing device, such as a mouse, track ball, pen device, which may be utilized in association with the keyboard 344, etc.), a display 346, and in some cases, a printer component 332 (e.g., inkjet printer, LaserJet printer, multi-function printer, etc.) which may communicate electronically with a printer device or a variety of printing devices. Communication with such printing devices may occur via, for example, the Internet or any other networked environment.

As illustrated, the various components of data-processing system 400 can communicate electronically through the system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or can be implemented in the context of a client and a server (i.e., where aspects are practiced on the client and the server). The data-processing system 400 may also be, for example, a standalone desktop computer, a laptop computer, a Smartphone, a pad computing device, a server, and so on.

FIG. 12 illustrates a computer software system 450 for directing the operation of the data-processing system 400 shown in FIG. 11. Software application 454 stored, for example, in memory 342 generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as module 452, which can, for example, implement instructions or operations such as those described herein. Examples of instructions that can be implemented by module 452 include steps or operations such as those shown and described herein with respect to blocks 62, 64, 66, 68, 70, 72, 74 of FIG. 6; blocks 81, 82, 84, 85, 86, 87, 88 of FIG. 8; blocks 92, 94, 96, 98, 100, 102 of FIG. 9; and the various modules shown in FIG. 10, and so on.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application stored in a memory such as, for example, memory 342. However, a module may also be composed of, for example, electronic and/or computer hardware or such hardware in combination with software. In some cases, a "module" can also constitute a database and/or electronic hardware and software that interact with the database. Examples of such databases are databases 119 and 117 shown in FIG. 10 and the storage module 100 depicted in FIG. 9.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. A module can also be composed of other modules or sub-modules.

Thus, the instructions or steps such as those and discussed elsewhere herein can be implemented in the context of such a module, modules, sub-modules, and so on. Examples of such modules are the various modules such as module 452 and its sub-modules 112, 114, 118, 120, 122, and 124 shown in FIG. 10.

FIGS. 11-12 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

The disclosed embodiments offer several advantages and unique features by minimizing false alerts triggering which results in unnecessary service calls by utilizing the sequential data collected from the device in a device manager application (DMA). Such an approach provides for supervised learning based print alerts by utilizing sequential print state data and corresponding sequential print status data using HMMs and Viterbi algorithm. Utilizing the learned model, a DMA allows a user to proactively trigger print alerts rather than solely relying on the information extracted from the device. The disclosed embodiments also provide for the expansion of the print status alert prediction model utilizing a semi-supervised learning technique. This will save time and effort for obtaining ground truth data for print status and print state in different machines and different printer models.

The disclosed embodiments additionally provide for a list of print status and predetermined severity levels of alerts. The proposed approach provides the ability to predict the maximum likelihood of the sequence of latent print states for the given sequence of print status by calculating the corresponding probability. This is neither a static nor a predetermined list of print alerts since the alerts are determined and triggered based on the learned model from the gathered data acquired from the device.

Based on the foregoing, it can be appreciated that a number of example embodiments, preferred and alternative, are disclosed. For example, in one embodiment, a method can be implemented for remotely providing a device status alert. Such an example method can include steps or operations, for example, for subjecting data indicative of a status of one or more devices to an HMM (Hidden Markov Model) and a dynamic programming algorithm to determine a latent state of the at least one device; training a status alert model based on the data subjected to the HMM and the Viterbi algorithm; expanding the status alert model with respect to a wide range of devices including the device(s) utilizing semi-supervised learning; and integrating the status alert model into a device management application that provides a status alert regarding the device(s) and based on the status alert model.

In another example embodiment, a step or operation can be implemented for periodically and remotely collecting the data indicative of a status of the least one device prior to subjecting the data to the HMM and the dynamic programming algorithm. In yet another embodiment, the aforementioned dynamic programming algorithm may be a Viterbi algorithm. In another example embodiment, the step or operation of training a status alert model based on the data subjected to the HMM and the Viterbi algorithm can further include a step or operation for training the status alert model utilizing a labeled print state. In still another embodiment, the step or operation for training a status alert model based on the data subjected to the HMM and the Viterbi algorithm can further include a step or operation for testing the status alert model utilizing unseen data. In another embodiment, the step or operation of training a status alert model based on the data subjected to the HMM and the Viterbi algorithm can further involve steps or operations for training the status alert model utilizing labeled print state data and testing the status alert model utilizing unseen data.

In yet another embodiment, a system for remotely providing a device status alert, the system at least one processor can be implemented. Such a system can include, for example, a computer-usable medium embodying computer program code, the computer-usable medium capable of communicating with the at least one processor, the computer program code comprising instructions executable by the at least one processor and configured for: subjecting data indicative of a status of at least one device to an HMM (Hidden Markov Model) and a dynamic programming algorithm to determine a latent state of the device(s); training a status alert model based on the data subjected to the HMM and the dynamic programming algorithm; expanding the status alert model with respect to a wide range of devices including the device(s) utilizing semi-supervised learning; and integrating the status alert model into a device management application that provides a status alert regarding the device(s) and based on the status alert model.

In still another example embodiment, a processor-readable medium storing code representing instructions to cause a process for remotely providing a device status alert can be implemented. Such code can include code to, for example: subject data indicative of a status of at least one device to an HMM (Hidden Markov Model) and a dynamic programming algorithm to determine a latent state of the device(s); train a status alert model based on the data subjected to the HMM and the dynamic programming algorithm; expand the status alert model with respect to a wide range of devices including the device(s) utilizing semi-supervised learning; and integrate the status alert model into a device management application that provides a status alert regarding the device(s) and based on the status alert model.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for remotely providing a device status alert, said method comprising:
   subjecting data indicative of a status of at least one device to an HMM (Hidden Markov Model) and a dynamic programming algorithm to determine a latent state of said at least one device;
   training a status alert model based on said data subjected to said HMM and said dynamic programming algorithm;
   expanding said status alert model with respect to a wide range of devices including said at least one device utilizing semi-supervised learning; and
   integrating said status alert model into a device management application that provides a status alert regarding said at least one device and based on said status alert model.

2. The method of claim 1 further comprising periodically and remotely collecting said data indicative of a status of said least one device prior to subjecting said data to said HMM and said dynamic programming algorithm.

3. The method of claim 2 wherein said dynamic programming algorithm comprises a Viterbi algorithm.

4. The method of claim 1 wherein said dynamic programming algorithm comprises a Viterbi algorithm.

5. The method of claim 4 wherein training a status alert model based on said data subjected to said HMM and said Viterbi algorithm, further comprises training said status alert model utilizing a labeled print state.

6. The method of claim 4 wherein training a status alert model based on said data subjected to said HMM and said Viterbi algorithm, further comprises testing said status alert model utilizing unseen data.

7. The method of claim 4 wherein training a status alert model based on said data subjected to said HMM and said Viterbi algorithm, further comprises:
   training said status alert model utilizing labeled print state data; and
   testing said status alert model utilizing unseen data.

8. A system for remotely providing a device status alert, said system comprising:
   at least one processor;
   a non-transitory computer-usable medium embodying computer program code, said non-transitory computer-usable medium capable of communicating with said at least one processor, said computer program code comprising instructions executable by said at least one processor and configured for:
      subjecting data indicative of a status of at least one device to an HMM (Hidden Markov Model) and a dynamic programming algorithm to determine a latent state of said at least one device;
      training a status alert model based on said data subjected to said HMM and said dynamic programming algorithm;
      expanding said status alert model with respect to a wide range of devices including said at least one device utilizing semi-supervised learning; and
      integrating said status alert model into a device management application that provides a status alert regarding said at least one device and based on said status alert model.

9. The system of claim 8 wherein said instructions are further configured for periodically and remotely collecting said data indicative of a status of said least one device prior to subjecting said data to said HMM and said dynamic programming algorithm.

10. The system of claim 9 wherein said dynamic programming algorithm comprises a Viterbi algorithm.

11. The system of claim 8 wherein said dynamic programming algorithm comprises a Viterbi algorithm.

12. The system of claim 11 wherein training a status alert model based on said data subjected to said HMM and said Viterbi algorithm, further comprises training said status alert model utilizing a labeled print state.

13. The system of claim 11 wherein training a status alert model based on said data subjected to said HMM and said Viterbi algorithm, further comprises testing said status alert model utilizing unseen data.

14. The system of claim 11 wherein training a status alert model based on said data subjected to said HMM and said Viterbi algorithm, further comprises:
   training said status alert model utilizing labeled print state data; and
   testing said status alert model utilizing unseen data.

15. A non-transitory processor-readable medium storing code representing instructions to cause a process for remotely providing a device status alert, said code comprising code to:
   subject data indicative of a status of at least one device to an HMM (Hidden Markov Model) and a dynamic programming algorithm to determine a latent state of said at least one device;
   train a status alert model based on said data subjected to said HMM and said dynamic programming algorithm;
   expand said status alert model with respect to a wide range of devices including said at least one device utilizing semi-supervised learning; and
   integrate said status alert model into a device management application that provides a status alert regarding said at least one device and based on said status alert model.

16. The non-transitory processor-readable medium of claim 15 wherein said code is further configured to periodically and remotely collect said data indicative of a status of said least one device prior to subjecting said data to said HMM and said dynamic programming algorithm.

17. The non-transitory processor-readable medium of claim 15 wherein said dynamic programming algorithm comprises a Viterbi algorithm.

18. The non-transitory processor-readable medium of claim 17 wherein said code to train a status alert model based on said data subjected to said HMM and said Viterbi algorithm, further comprises code to train said status alert model utilizing a labeled print state.

19. The non-transitory processor-readable medium of claim 17 wherein said code to train a status alert model based on said data subjected to said HMM and said Viterbi algorithm, further comprises code to test said status alert model utilizing unseen data.

20. The non-transitory processor-readable medium of claim 17 wherein said code to train a status alert model based on said data subjected to said HMM and said Viterbi algorithm, further comprises code to:
   train said status alert model utilizing labeled print state data; and
   test said status alert model utilizing unseen data.

* * * * *